United States Patent [19]

Bosch et al.

[11] Patent Number: 5,399,615
[45] Date of Patent: Mar. 21, 1995

[54] STABILIZED ORGANOPOLYSILOXANES

[75] Inventors: Erhard Bosch, Winhöring; Josefine Eckl, Simbach, both of Germany

[73] Assignee: Wacker-Chemie GmbH, Munich, Germany

[21] Appl. No.: 220,333

[22] Filed: Mar. 30, 1994

[30] Foreign Application Priority Data

Mar. 31, 1993 [DE] Germany .................. 43 10 593.9

[51] Int. Cl.$^6$ .................. C08K 5/15; C09K 5/00
[52] U.S. Cl. .................. 524/753; 524/773; 524/860; 252/48.6; 252/49.6; 252/78.1; 252/78.3
[58] Field of Search .................. 252/48.6, 49.6, 78.1, 252/78.3; 524/860, 753, 773

[56] References Cited

U.S. PATENT DOCUMENTS

| | | | |
|---|---|---|---|
| 4,335,004 | 6/1982 | Efner | 252/48.6 |
| 4,909,952 | 3/1990 | Salomon et al. | 252/48.6 |
| 4,959,166 | 9/1990 | Minamitani et al. | 252/327 E |
| 5,013,838 | 5/1991 | Scholl | 544/193 |
| 5,130,041 | 7/1992 | Groenhof | 252/78.3 |
| 5,171,464 | 12/1992 | de Montigny et al. | 252/49.6 |
| 5,244,591 | 9/1993 | Middleton | 252/48.6 |
| 5,273,670 | 12/1993 | Endres et al. | 252/49.6 |
| 5,334,319 | 8/1994 | Tomizawa et al. | 352/78.3 |

FOREIGN PATENT DOCUMENTS

0191456  8/1986  European Pat. Off. .
0397507  11/1990 European Pat. Off. .

*Primary Examiner*—Melvyn I. Marquis
*Assistant Examiner*—Karen A. Dean
*Attorney, Agent, or Firm*—Martin Connaughton

[57] ABSTRACT

The stabilized organopolysiloxanes which comprise thiodiglycolic esters of the formula $$R^1-O-\underset{\underset{O}{\|}}{C}-(CH_2)_x-S_n-(CH_2)_y-\underset{\underset{O}{\|}}{C}-O-R^1 \quad (I)$$

in which
  $R^1$ can be identical or different monovalent, unsubstituted or halogen-substituted $C_1$–$C_{18}$-hydrocarbon radicals,
  x and y, independently of one another, are each integers from 1 to 10 and
  n is an integer from 1 to 5.

The stabilized organopolysiloxane oils are suitable for use as heat and power transfer media.

3 Claims, No Drawings

STABILIZED ORGANOPOLYSILOXANES

The present invention relates to organopolysiloxanes stabilized with thiodiglycolic esters and the use thereof as heat and power transfer media.

BACKGROUND OF INVENTION

Organopolysiloxane oils are used as energy transfer media in hydraulic systems, heat transfer systems and viscous or fan couplings. They are subjected to great stresses such as high shear forces, high temperatures and abraded metal. The characteristics of the devices must not change in response to any of these stresses; thus despite the viscosity changing owing to shear and temperature, the transmitted torques should remain as constant as possible. On no account should the organopolysiloxane oil gel, because gelling of the organopolysiloxane oil would eventually lead to failure of the system. For this reason commercial organopolysiloxane oils, which are desirable because of the low temperature dependence of their viscosity, their good thermal stability and the ease of preparing them with any viscosity, are not suitable for sustained use since they usually gel. For these applications, specific additives are needed as stabilizers.

As such additives, EP-A-191 456 describes zirconium-containing organosiloxanes together with cerium-containing organosiloxanes; U.S. Pat. No. 5,013,858 describes mixtures of anthraquinone compounds with polymethylhydrogensilanes terminated by trimethylsilyl end groups; EP-A-397 507 describes phosphorus-containing compounds to which sulfur compounds such as di- and trisulfides or zinc dithiophosphates can also be added, or metal deactivators and/or corrosion inhibitors, and U.S. Pat. No. 4,959,166 describes hydrocarbon sulfide, the reaction product of oil or fat with sulfur, a zinc dithiophosphate, a metal salt of dialkyldithiocarbamic acid, elemental sulfur and a cyclic hydrocarbon sulfide.

The additives described improve the stability of the organopolysiloxanes, specifically their stability to gelation, only insufficiently.

SUMMARY OF INVENTION

It is an object of the present invention to provide stabilized organopolysiloxane oils which, when subjected to high mechanical and thermal stresses and contamination by abraded metal, exhibit only small changes in their viscosity and transmitted torque characteristics and have little tendency to gel and shall be suitable for use as heat and power transfer media.

The invention provides stabilized organopolysiloxanes comprising thiodiglycolic esters of the formula

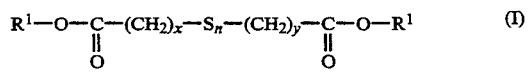         (I)

in which
  $R^1$ can be identical or different monovalent, unsubstituted or halogen-substituted $C_1$–$C_{18}$-hydrocarbon radicals,
  x and y, independently of one another, are each integers from 1 to 10 and
  n is an integer from 1 to 5.

Examples of radicals $R^1$ are alkyl radicals such as the methyl, ethyl, n-propyl, iso-propyl, n-butyl, iso-butyl, tert-butyl, n-pentyl, iso-pentyl, neo-pentyl, and tert-pentyl radical; hexyl radicals such as the n-hexyl radical; heptyl radicals such as the n-heptyl radical; octyl radicals such as the n-octyl radical, 2-ethylhexyl radical and iso-octyl radicals, such as the 2,2,4-trimethylpentyl radical; nonyl radicals such as the n-nonyl radical; decyl radicals such as the n-decyl radical; dodecyl radicals such as the n-dodecyl radical; alkenyl radicals such as the vinyl and the allyl radical; cyclo-alkyl radicals such as cyclopentyl, cyclohexyl, cycloheptyl radicals and methylcyclohexyl radicals; aryl radicals such as the phenyl and the naphthyl radical; alkaryl radicals such as o-, m-, p-tolyl radicals, xylyl radicals and ethylphenyl radicals; aralkyl radicals such as the benzyl radical, the α- and the β-phenylethyl radical.

Examples of halogen-substituted radicals $R^1$ are haloalkyl radicals such as the 3-chloropropyl radical, the 3,3,3-trifluoro-n-propyl radical, the 2,2,2,2′,2′,2′-hexafluoroisopropyl radical, the heptafluoroisopropyl radical, and haloaryl radicals such as the o-, m- and p-chlorophenyl radical.

In the thiodiglycolic esters of formula I, the radicals $R^1$ are preferably saturated halogen-free $C_1$–$C_{10}$-hydrocarbon radicals. Particular preference is given to ethyl, propyl and 2-ethylhexyl radicals.

In formula I, x and y, independently of one another, preferably range from 1 to 3, more preferably are 1. In formula I, n is preferably 1 or 2.

Pure thiodiglycolic esters of formula I can be used, or mixtures of the thiodiglycolic esters can be used.

The thiodiglycolic esters of formula I are known per se. They can be obtained, for example, by acid-catalyzed, azeotropic esterification of thiodiglycolic acids or dithiodiglycolic acids or mixtures of the two acids with the alcohols $R^1$-OH in a molar ratio of about 1:2 in toluene.

The above mentioned acids are obtainable, from Aldrich Chemical Co., Inc., Milwaukee, Wis., U.S.A.

The organopolysiloxanes preferably have the formula

         (II)

in which
  R can be identical or different monovalent, unsubstituted or halogen-substituted, $C_1$–$C_{18}$-hydrocarbon radicals, and
  a is 0, 1, 2 or 3, on an average of from 1.8 to 2.2, preferably from 1.9 to 2.1.

The organopolysiloxanes used are in particular linear organopolysiloxanes of the formula

         (III), in which
  R is as defined above and
  m is an integer from 1 to 4000.

Examples of radicals R are the examples given above for the radicals $R^1$.

Preferred radicals R are the saturated halogen-free $C_1$–$C_6$-hydrocarbon radicals, the tolyl and the phenyl radicals, in particular the methyl and phenyl radicals.

The organopolysiloxanes employed preferably have a viscosity of from 50 to 1,000,000, in particular from 1000 to 500,000, mm²/s at 25° C.

The thiodiglycolic esters of formula I increase the stability of the organopolysiloxanes considerably more strongly than known additives. For example, the gel time is considerably longer and the changes in the viscosity and the torques are considerably lower than when known additives are used. The stabilized organopolysiloxane oils are therefore exceptionally suitable for use as heat and power transfer media.

The stabilized organopolysiloxanes preferably comprise thiodiglycolic esters in amounts of from 0.001 to 5, in particular from 0.1% to 2.5% by weight. The stabilized organopolysiloxanes can additionally contain additives known per se, such as antioxidants or lubricants, preferably in amounts up to 5% by weight in each case. In the following examples, unless indicated otherwise, (a) all amounts are % by weight;
(b) all pressures are 0.10 mPa (abs.);
(c) all temperatures are 25° C.

EXAMPLES

Preparation of additive A:

0.5 mole (75 g) of thiodiglycolic acid and 0.5 mole (91 g) of dithiodiglycolic acid, 4 mole (520 g) of 2-ethylhexanol, 4 mole (368 g) of toluene and 10 g of p-toluenesulfonic acid were added to a 2 liter 3-neck flask.

A water separator which had been filled with toluene was fitted between flask and reflux condenser. While stirring, the mixture was heated under reflux and the reaction was monitored via the amount of water separated out. After about 6 hours, the reaction was complete. After cooling, the mixture was neutralized by washing with aqueous sodium bicarbonate solution. Subsequently the solvent and the excess alcohol were distilled off under vacuum. The residue remaining, about 95% of theory, was a pale yellowish liquid having a viscosity between 10 and 20 mm$^2$/s. The density of the substance was 1 g/ccm and it had a sulfur content of 12.4% by weight. According to the NMR spectrum it was a mixture of bis(2-ethylhexyl) esters of thio- and dithiodiglycolic acids. This ester mixture was readily miscible in amounts up to about 5% by weight with the silicone oil used below.

Example 1

(A) 50 g of a dimethylpolysiloxane terminated by trimethylsilyl end groups and having a viscosity of 100,000 mm$^2$/s (Silicone Oil AK 100000 from Wacker-Chemie GmbH) were placed in a 100 ml glass beaker, admixed with 1% by weight of additive A, and heated for comparison with the silicone oil without any additive and with additions of 1% by weight of triphenyl thiophosphate or 1% by weight of dibenzyl disulfide or 1% by weight of triphenyl phosphate at 200° C. in a circulating-air drying oven while the time in days until gelation of the oils was monitored. The silicone oil without additive gelled after 5 days, that with dibenzyl disulfide after 7 days, those with triphenyl thiophosphate and triphenyl phosphate after 8 days and that with additive A gelled only after 10 days.

(B) The experiments were repeated using a 2% by weight addition of additive; the times until the oils gelled were as follows:

| without additive | 5 days |
|---|---|
| with 2% by weight of dibenzyl disulfide | 7 days |
| with 2% by weight of triphenyl thiophosphate | 8 days |
| with 2% by weight of triphenyl phosphate | 8 days |
| with 2% by weight of additive A | 12 days |

(C) The experiments were repeated using a 2% by weight addition of additive and temperatures of 225° C. in the circulating-air drying oven; the times until the oils gelled were as follows:

| without additive | 16 hours |
|---|---|
| with 2% by weight of dibenzyl disulfide | 64 hours |
| with 2% by weight of triphenyl thiophosphate | 6 hours |
| with 2% by weight of triphenyl phosphate | 24 hours |
| with 2% by weight of additive A | 120 hours. |

(D) The experiments were repeated using a 2% by weight addition of additive and temperatures of 250° C. in the circulating-air drying oven; the times until the oils gelled were as follows:

| without additive | 6 hours |
|---|---|
| with 2% by weight of dibenzyl disulfide | 24 hours |
| with 2% by weight of triphenyl thiophosphate | 4 hours |
| with 2% by weight of triphenyl phosphate | 8 hours |
| with 2% by weight of additive A | 40 hours. |

(E) The experiments were repeated using a dimethylpolysiloxane terminated by trimethylsilyl end groups and having a viscosity of 60,000 mm$^2$/s (Silicone Oil AK 60000 from Wacker-Chemie GmbH), 2% by weight of additive and at a temperature of 250° C.; the times until the oils gelled were as follows:

| without additive | 8 hours |
|---|---|
| with 2% by weight of dibenzyl disulfide | 24 hours |
| with 2% by weight of triphenyl thiophosphate | 6 hours |
| with 2% by weight of triphenyl phosphate | 6 hours |
| with 2% by weight of additive A | 40 hours. |

The experiments show quite unambiguously that, regardless of the temperature, the amount added and the viscosity of the silicone oil used, the samples with additive A, i.e., based on thiodiglycolic esters, have the highest resistance to gelation.

Example 2

(a) On a test bench provided with a viscous coupling, tests were carried out with a dimethylpolysiloxane containing trimethylsilyl end groups and having a viscosity of 60,000 mm$^2$s$^{-1}$ (Silicone Oil AK 60000 from Wacker-Chemie GmbH). No additive, 2% by weight of additive A, 2% by weight of triphenyl thiophosphate, 2% by weight of triphenyl phosphate and 2% by weight of dibenzyl disulfide were added to samples of the silicone oil. The coupling ran in an oil bath having a temperature of 70° C., which gives a surface zone temperature of 130° C. in the coupling. The number of lamellae in the coupling was 49. The coupling was filled to 85% with silicone oil at 25° C. The coupling was run at a differential speed of 50 revolutions per minute. During the test the torque was measured and after 24 hours the test was stopped. The changes in the torque and in the viscosity were determined. The results are summarized in Table 1.

TABLE 1

Changes in the viscosity and the torque in percent, AK 60000

| Additive: | Torque | Viscosity |
|---|---|---|
| none | +10.3% | +78.0% |
| with 2% of additive A | −8.2% | −4.0% |
| with 2% of triphenyl thiophosphate | −11.1% | −7.2% |
| with 2% of triphenyl phosphate | −11.4% | −7.1% |

TABLE 1-continued

| Changes in the viscosity and the torque in percent, AK 60000 | | |
|---|---|---|
| Additive: | Torque | Viscosity |
| with 2% of dibenzyl disulfide | −13.8% | −9.0% |

(b) In the same test arrangement as described under 2a, the same silicone oils with the various additives were tested. In contrast to test 2a, the coupling now ran in an oil bath having a temperature of 100° C., which gave a surface zone temperature of 150° C. in the coupling. The other parameters were kept the same. The results are summarized in Table 2.

TABLE 2

| Changes in the viscosity and the torque in percent, AK 60000 | | |
|---|---|---|
| Additive: | Torque | Viscosity |
| none | +3.8% | +10.2% |
| with 2% of additive A | −3.5% | −3.0% |
| with 2% of triphenyl thiophosphate | −4.9% | −6.1% |
| with 2% of triphenyl phosphate | −9.5% | −8.0% |
| with 2% of dibenzyl disulfide | −7.8% | −7.1% |

These tests clearly show that a normal silicone oil is not suitable for this application, since the increases in both the viscosity and the torque are too large. All the additives tested give considerable improvements, but additive A clearly produces the smallest changes in the viscosity and in the torque at both temperatures.

What is claimed is:

1. A stabilized organopolysiloxane comprising thiodiglycolic esters of the formula

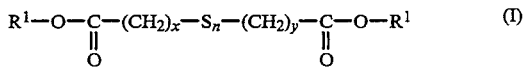

in which
R$^1$ can be identical or different monovalent, unsubstituted or halogen-substituted C$_1$–C$_{18}$-hydrocarbon radicals,
x and y, independently of one another, are each integers from 1 to 10 and
n is an integer from 1 to 5.

2. A stabilized organopolysiloxane as claimed in claim 1, wherein the thiodiglycolic ester content is from 0,001 to 5% by weight based on the total weight of the organopolysiloxane.

3. A heat or power transfer medium comprising the stabilized organopolysiloxane as claimed in claim 1.

* * * * *